(12) United States Patent
Kamiya et al.

(10) Patent No.: US 11,400,899 B2
(45) Date of Patent: Aug. 2, 2022

(54) BRAKING FORCE CONTROL APPARATUS

(71) Applicants: TOYOTA JIDOSHA KABUSHIKI KAISHA, Toyota (JP); ADVICS CO., LTD., Kariya (JP)

(72) Inventors: Yusuke Kamiya, Toyota (JP); Hayato Kubota, Kariya (JP)

(73) Assignees: TOYOTA JIDOSHA KABUSHIKI KAISHA, Toyota (JP); ADVICS CO., LTD., Kariya (JP)

( * ) Notice: Subject to any disclaimer, the term of this patent is extended or adjusted under 35 U.S.C. 154(b) by 148 days.

(21) Appl. No.: 16/876,656

(22) Filed: May 18, 2020

(65) Prior Publication Data
US 2020/0369247 A1    Nov. 26, 2020

(30) Foreign Application Priority Data
May 21, 2019  (JP) .............................. JP2019-094920

(51) Int. Cl.
| *B60T 8/17* | (2006.01) |
| *B60T 13/66* | (2006.01) |
| *B60T 1/06* | (2006.01) |
| *B60T 13/16* | (2006.01) |

(52) U.S. Cl.
CPC ............... *B60T 8/17* (2013.01); *B60T 1/065* (2013.01); *B60T 13/662* (2013.01); *B60T 13/165* (2013.01)

(58) Field of Classification Search
CPC ........ B60T 8/17; B60T 13/165; B60T 13/662; B60T 1/065
See application file for complete search history.

(56) References Cited

U.S. PATENT DOCUMENTS

| 9,126,575 | B2 * | 9/2015 | Kamiya | ................ B60T 13/686 |
| 10,625,721 | B2 * | 4/2020 | Ninoyu | ................ B60T 13/662 |
| 2015/0120161 | A1 * | 4/2015 | Kamiya | ................ B60T 7/042 701/70 |
| 2017/0120882 | A1 | 5/2017 | Ninoyu et al. | |

FOREIGN PATENT DOCUMENTS

| DE | 112011105454 T5 * | 4/2014 |
| JP | 2006-131121 A | 5/2006 |
| JP | 2015-182639 A | 10/2015 |

* cited by examiner

*Primary Examiner* — Pamela Rodriguez
(74) *Attorney, Agent, or Firm* — Sughrue Mion, PLLC

(57) ABSTRACT

A braking force control apparatus includes a fluid pressure generation mechanism, a braking mechanism and an electric control unit. The fluid pressure generation mechanism causes a braking mechanism to generate a required fluid pressure. The braking mechanism applies a braking force depending on the required fluid pressure to each of wheels through the pressing of a braking member against a rotating rotary member due to the required fluid pressure. The electronic control unit performs, when the required fluid pressure is generated and a vehicle state shifts from a running state to a stopped state at a first time point, stop-time boost control to boost the required fluid pressure at and after the first time point.

3 Claims, 10 Drawing Sheets

BRAKING FORCE CONTROL APPARATUS

CROSS-REFERENCE TO RELATED APPLICATION

This application claims priority to Japanese Patent Application No. 2019-094920 filed on May 21, 2019, incorporated herein by reference in its entirety.

BACKGROUND

1. Technical Field

The disclosure relates to a braking force control apparatus.

2. Description of Related Art

Conventionally, there is known a braking device that applies braking forces to wheels of a vehicle respectively. The braking device is equipped with a fluid pressure generation mechanism that generates a fluid pressure associated with a required braking force corresponding to a braking request, as a required fluid pressure, when the braking request is made, and braking mechanisms that are provided in the wheels respectively to apply braking forces depending on the required fluid pressure to the wheels respectively (e.g., see Japanese Patent Application Publication No. 2015-182639 (JP 2015-182639 A)).

SUMMARY

Each of the braking mechanisms includes a rotary member (e.g., a disc or a drum) that rotates together with the corresponding one of the wheels, and a braking member (e.g., a brake pad or a brake shoe) that can come into contact with the rotary member. This braking mechanism generates a braking force for braking rotation of the rotary member by pressing the braking member against the rotating rotary member through a fluid pressure generated by the fluid pressure generation mechanism, and converting rotational energy of the rotary member into thermal energy resulting from friction.

In general, the braking force depends on the frictional coefficient of the braking member, the area of contact between the braking member and the rotary member, the force (pressing force) with which the braking member is pressed against the rotary member, and the like. Among these values, the frictional coefficient and the area of contact can be decided in advance through designing. On the other hand, the pressing force can be decided from the required fluid pressure. However, even when the required fluid pressure is constant, the pressing force decreases, so the braking force may decrease. That is, while the braking member is pressed against the rotating rotary member, both the members thermally expand due to the friction heat generated in a region of contact therebetween. However, when a certain length of time elapses after the rotary member stops rotating, the volumes of both the members slightly decrease due to a fall in temperature. This is a well-known phenomenon called heat reduction. When the volumes of both the members decrease due to heat reduction, the pressing force decreases even though the required fluid pressure is constant, so the braking force may decrease. As a result, a vehicle in a stopped state may start moving against a driver's intention.

In addition, when the vehicle is in the stopped state due to the driver's own operation of a brake pedal, the driver may unintentionally reduce the force (depression force) for performing depression operation of the brake pedal (hereinafter referred to also as "depression force reduction"). As a result, the vehicle may start moving.

The disclosure provides a braking force control apparatus that can reduce the possibility of a vehicle starting to move against a driver's intention as a result of heat reduction or depression force reduction.

A braking force control apparatus according to the disclosure controls a braking force that is applied to each of wheels of a vehicle. The braking force control apparatus includes a fluid pressure generation mechanism, a braking mechanism, and an electronic control unit. The fluid pressure generation mechanism generates a fluid pressure associated with a required braking force corresponding to a braking request, as a required fluid pressure, when the braking request is made. The braking mechanism is provided in each of the wheels, and includes a rotary member that rotates together with each of the wheels, and a braking member that can come into contact with the rotary member. The braking mechanism applies a braking force depending on the required fluid pressure to each of the wheels through the pressing of the braking member against the rotating rotary member due to the required fluid pressure. The electronic control unit is configured to control the fluid pressure generation mechanism, specify whether a vehicle state of the vehicle is a running state or a stopped state, and perform stop-time boost control for boosting the required fluid pressure at and after a first time point when the required fluid pressure is generated and the specified vehicle state shifts from the running state to the stopped state at the first time point.

According to this configuration, stop-time boost control for boosting the required fluid pressure is performed at and after the first time point as the time point when the vehicle state shifts from the running state to the stopped state. Therefore, a braking force that is larger than the required braking force is applied to each of the wheels (in other words, the braking force is boosted) at and after the first time point. Therefore, even when heat reduction occurs, the possibility of the braking force applied to each of the wheels becoming smaller than the required braking force can be reduced. In addition, even when the required braking force itself decreases due to the occurrence of depression force reduction, the possibility of the braking force applied to each of the wheels becoming equal to or smaller than the braking force at the time when the vehicle starts moving can be reduced. Accordingly, the possibility of the vehicle starting to move as a result of heat reduction or depression force reduction can be reduced.

In another aspect of the disclosure, the electronic control unit may be configured to end the stop-time boost control and perform boost amount reduction control for reducing a boost amount of the required fluid pressure at and after a second time point with the passage of time, when the specified vehicle state shifts from the stopped state to the running state at the second time point during a period in which the stop-time boost control is performed.

According to this configuration, when the vehicle state shifts from the stopped state to the running state at the second time point in response to a fall in the required fluid pressure during the performance of stop-time boost control, boost amount reduction control for reducing the boost amount of the required fluid pressure with the passage of time is performed instead of stop-time boost control. Thus, the braking force gently changes before and after the second time point. Therefore, the possibility of the vehicle starting to move swiftly at the second time point can be reduced.

In still another aspect of the disclosure, the electronic control unit may be configured to end the boost amount reduction control and perform boost amount hold control during a first period or a second period, when a variation in fluid pressure changes from a decreasing tendency to a remaining or increasing tendency at the third time point during a period in which the boost amount reduction control is performed. The boost amount hold control is a control for holding the boost amount of the required fluid pressure equal to the boost amount at a third time point. The first period is a period from the third time point to a time point when the specified vehicle state shifts from the running state to the stopped state again. The second period is a period from the third time point to a time point when the variation in fluid pressure changes to the decreasing tendency again. The variation in fluid pressure is a variation in the required fluid pressure obtained through subtracting the boost amount from the required fluid pressure.

According to this configuration, when the variation in fluid pressure (the variation in the required fluid pressure obtained through subtraction of the boost amount) changes from the decreasing tendency to the remaining or increasing tendency at the third time point during the performance of boost amount reduction control, boost amount hold control for holding the boost amount of the required fluid pressure equal to the boost amount at the third time point is performed instead of boost amount reduction control. This boost amount hold control is performed over the period from the third time point to the time point when the vehicle state shifts from the running state to the stopped state again, or over the period from the third time point to the time point when the variation in fluid pressure changes to the decreasing tendency again. Therefore, even when heat reduction occurs during these periods, the possibility of the braking force applied to each of the wheels becoming smaller than the required braking force can be reduced.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Embodiments

Figure 1:
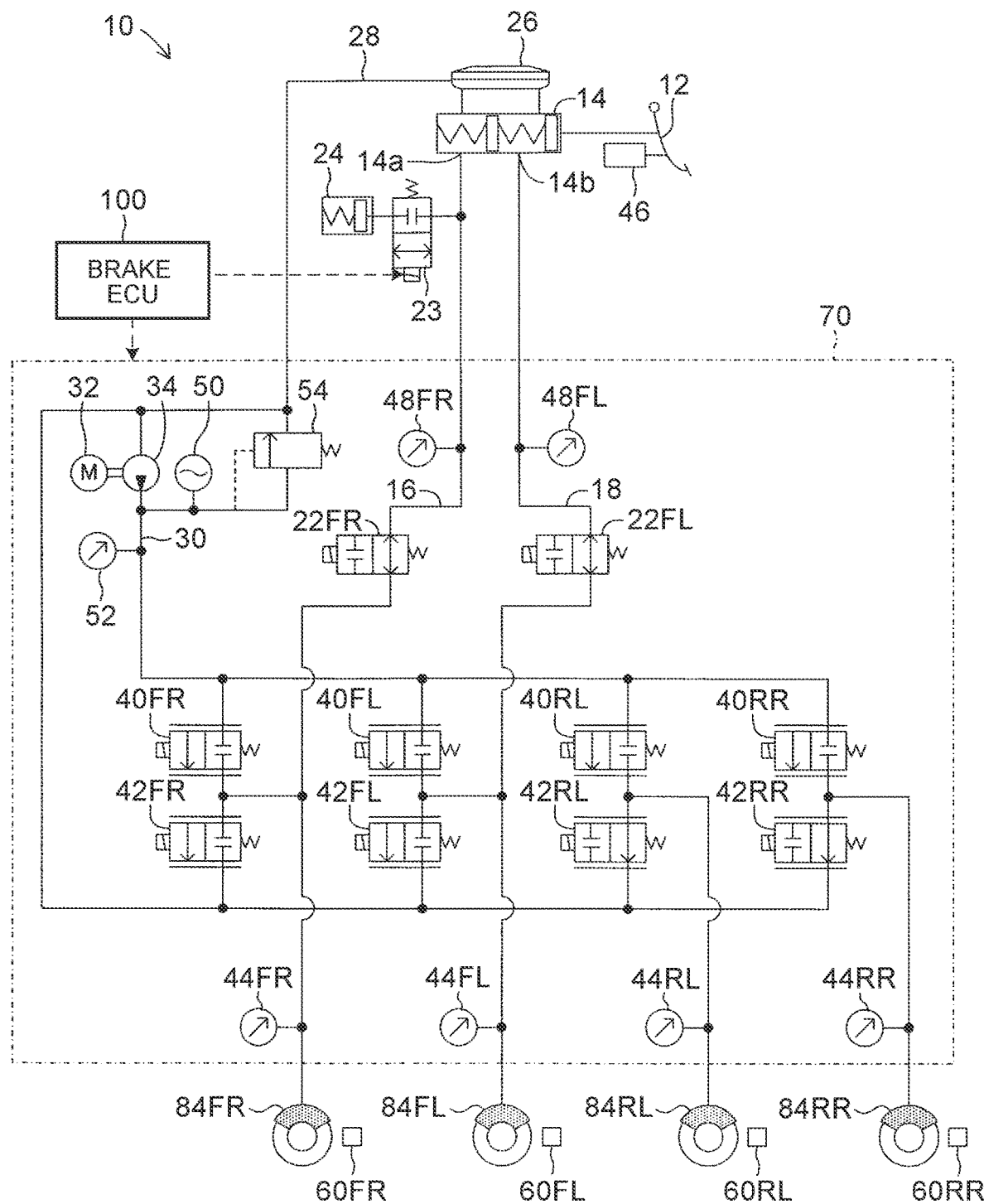
FIG. 1 is a general configuration view of a braking force control apparatus according to one of the embodiments of the disclosure.

As shown in FIG. 1, a braking force control apparatus according to one of the embodiments of the disclosure (hereinafter referred to also as "the apparatus of the present embodiment) 10 constitutes a vehicular electronically controlled brake system (ECB), and controls braking forces that are applied to four wheels provided in a vehicle. The apparatus 10 of the present embodiment is mounted in, for example, a hybrid vehicle that is equipped with an electric motor and an internal combustion engine as drive sources for running. In this hybrid vehicle, regenerative braking for braking the vehicle through regeneration of kinetic energy of the vehicle into electric energy, and hydraulic braking by the apparatus 10 of the present embodiment can each be used to brake the vehicle. The vehicle that is mounted with the apparatus 10 according to the present embodiment can perform brake regeneration cooperative control for generating a desired braking force by combining this regenerative braking and this hydraulic braking with each other.

A brake pedal (BP) 12 is connected to a master cylinder 14 that delivers hydraulic fluid that has been raised in pressure in accordance with a driver's depression operation. The brake pedal 12 is provided with a stroke sensor 46 for detecting a depression stroke thereof.

A stroke simulator 24 that creates a pedal stroke corresponding to a depression force applied to the brake pedal 12 by the driver is connected to a first output port 14*a* of the master cylinder 14. A simulator cut valve 23 is provided in a flow channel that connects the master cylinder 14 and the stroke simulator 24 to each other, except at end portions of the flow channel. The simulator cut valve 23 is a normally-closed electromagnetic on-off valve that opens through energization in normal circumstances, and that closes at the time of non-energization that may result from the occurrence of abnormalities. Besides, a reservoir tank 26 for storing hydraulic fluid is connected to the master cylinder 14.

A brake fluid pressure control pipe 16 for the front-right wheel is connected to the first output port 14*a* of the master cylinder 14. The brake fluid pressure control pipe 16 is connected to a wheel cylinder 84FR for the front-right wheel that applies a braking force to the front-right wheel (not shown) of the vehicle. On the other hand, a brake fluid pressure control pipe 18 for the front-left wheel is connected to a second output port 14*b* of the master cylinder 14. The brake fluid pressure control pipe 18 is connected to a wheel cylinder 84FL for the front-left wheel that applies a braking force to the front-left wheel (not shown) of the vehicle.

A right electromagnetic on-off valve 22FR is provided in the brake fluid pressure control pipe 16 for the front-right wheel, except at end portions thereof. A left electromagnetic on-off valve 22FL is provided in the brake fluid pressure control pipe 18 for the front-left wheel, except at end portions thereof. Each of this right electromagnetic on-off valve 22FR and this left electromagnetic on-off valve 22FL is a normally open electromagnetic on-off valve that is open at the time of non-energization and that is changed over to a closed state thereof at the time of energization. Incidentally, in the following description, the right electromagnetic on-off valve 22FR and the left electromagnetic on-off valve 22FL will be comprehensively referred to simply as "electromagnetic on-off valves 22" as well.

A right master pressure sensor 48FR that detects a master cylinder pressure of the front-right wheel side is provided in the brake fluid pressure control pipe 16 for the front-right wheel, except at the end portions thereof. A left master pressure sensor 48FL that detects a master cylinder pressure of the front-left wheel side is provided in the brake fluid pressure control pipe 18 for the front-left wheel, except at the end portions thereof. In the apparatus 10 of the present embodiment, when the driver depresses the brake pedal 12, the stroke sensor 46 detects a pedal stroke as a depression operation amount of the brake pedal 12. However, a depression operation force (a depression force) of the brake pedal 12 can also be obtained from master cylinder pressures that are detected by this right master pressure sensor 48FR and this left master pressure sensor 48FL. It is favorable from the standpoint of failsafe to monitor the master cylinder pressures by the two pressure sensors 48FR and 48FL, taking into account the possibility of a failure of the stroke sensor 46. Incidentally, in the following description, the right master pressure sensor 48FR and the left master pressure sensor 48FL will be comprehensively referred to simply as "master cylinder pressure sensors 48" as well.

On the other hand, one end of a fluid pressure supply/discharge pipe 28 is connected to the reservoir tank 26, and a suction port of an oil pump 34 that is driven by a motor 32 is connected to the other end of this fluid pressure supply/discharge pipe 28. A discharge port of the oil pump 34 is connected to a high-pressure pipe 30. An accumulator 50 and a relief valve 54 are connected to this high-pressure pipe 30. Incidentally, for example, a reciprocating pump equipped with two or more pistons (not shown) that are moved in a reciprocating manner by the motor 32 can be adopted as the oil pump 34. In addition, for example, a pressure accumulation device that converts pressure energy of hydraulic fluid into pressure energy of nitrogen-containing gas to accumulate the latter can be adopted as the accumulator 50.

The accumulator 50 usually accumulates the hydraulic fluid that has been raised in pressure to a predetermined fluid pressure range by the oil pump 34. A valve outlet of the relief valve 54 is connected to the fluid pressure supply/discharge pipe 28. When the pressure of hydraulic fluid in the accumulator 50 becomes abnormally high, the relief valve 54 opens, and the high-pressure hydraulic fluid is returned to the fluid pressure supply/discharge pipe 28. Furthermore, the high-pressure pipe 30 is provided with an accumulator pressure sensor 52 that detects a pressure at an outlet of the accumulator 50, namely, a pressure of hydraulic fluid in the accumulator 50.

Moreover, the high-pressure pipe 30 is connected to the wheel cylinder 84FR for the front-right wheel, the wheel cylinder 84FL for the front-left wheel, the wheel cylinder 84RR for the rear-right wheel, and the wheel cylinder 84RL for the rear-left wheel via pressure increasing valves 40FR, 40FL, 40RR, and 40RL respectively. Incidentally, the pressure increasing valves 40FR to 40RL will be comprehensively referred to simply as "pressure increasing valves 40" as well, and the wheel cylinders 84FR to 84RL will be comprehensively referred to simply as "wheel cylinders 84" as well. Each of the pressure increasing valves 40 is a normally closed electromagnetic valve (linear valve) that is utilized to increase the pressure of each of the wheel cylinders 84 as needed.

Figure 2:
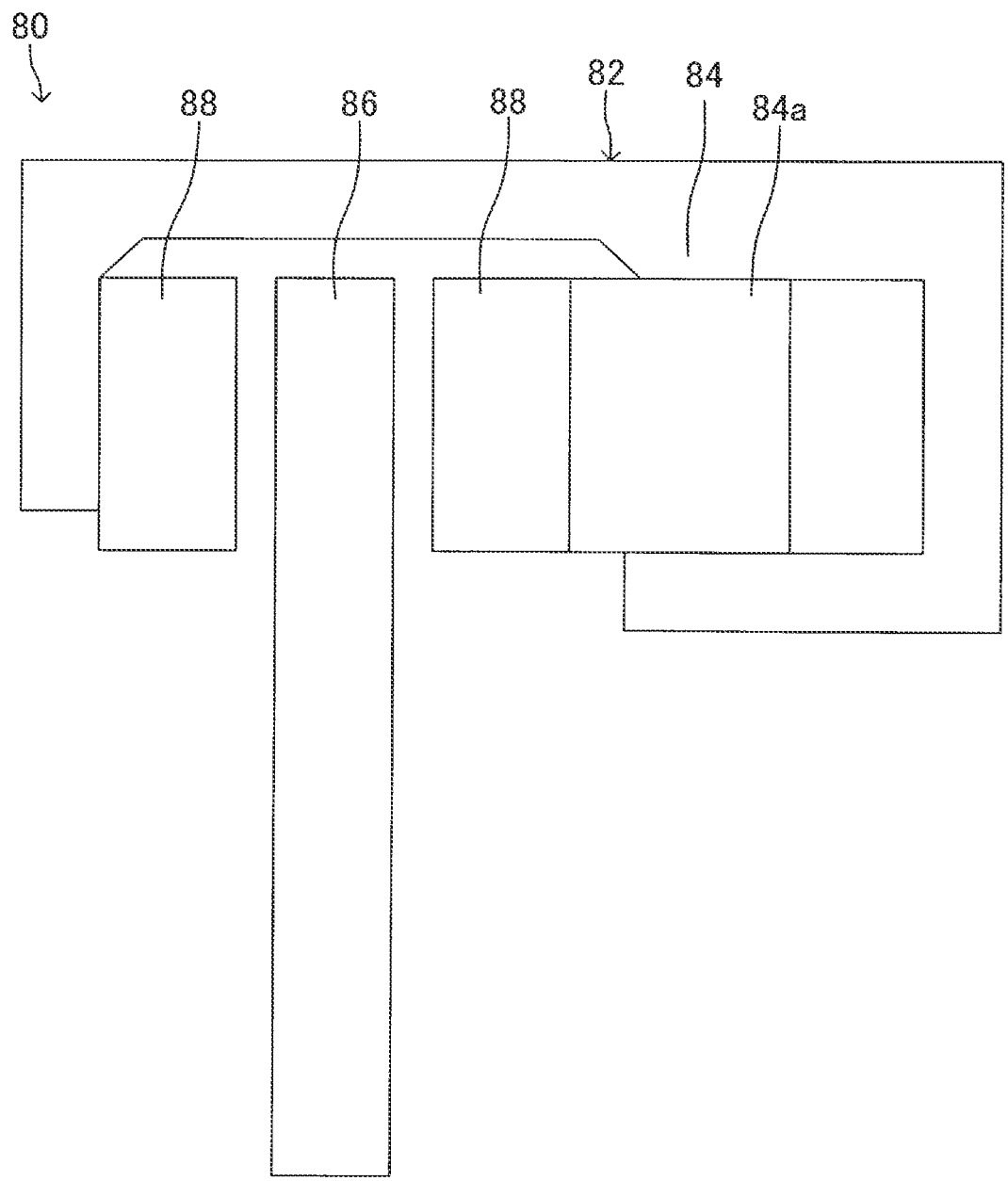
FIG. 2 is a schematic view of a disc brake unit.

It should be noted herein that disc brake units 80 as a braking mechanisms are provided for the wheels (not shown) of the vehicle respectively as shown in FIG. 2. Each of the disc brake units 80 is equipped with a caliper 82, a disc 86 as a rotary member, and a brake pad 88 as a braking member. The wheel cylinder 84 is incorporated in the caliper 82, and has a piston 84a. The disc 86 can rotate in a circumferential direction together with the corresponding one of the wheels. The brake pad 88 is supported by the caliper 82, is disposed in such a manner as to clamp the disc 86, and can come into contact with the disc 86. The disc brake unit 80 generates a braking force by pushing out the piston 84a through the pressure of hydraulic fluid applied to the wheel cylinder 84 and pressing the brake pad 88 against the disc 86.

The description will be continued by referring again to FIG. 1. The wheel cylinder 84FR for the front-right wheel and the wheel cylinder 84FL for the front-left wheel are connected to the fluid pressure supply/discharge pipe 28 via a pressure reducing valve 42FR and a pressure reducing valve 42FL respectively. Each of the pressure reducing valve 42FR and the pressure reducing valve 42FL is a normally closed electromagnetic valve (linear valve) that is utilized to reduce the pressure of the corresponding one of the wheel cylinders 84FR and 84FL as needed. On the other hand, the wheel cylinder 84RR for the rear-right wheel and the wheel cylinder 84RL for the rear-left wheel are connected to the fluid pressure supply/discharge pipe 28 via a pressure reducing valve 42RR and a pressure reducing valve 42RL as normally closed electromagnetic valves (linear valves) respectively. Incidentally, in the following description, the pressure reducing valves 42FR to 42RL will be comprehensively referred to simply as "pressure reducing valves 42" as well.

Wheel cylinder pressure sensors 44FR, 44FL, 44RR, and 44RL that detect wheel cylinder pressures as pressures of hydraulic fluid applied to the corresponding wheel cylinders 84 respectively are provided in the vicinity of the wheel cylinders 84FR to 84RL for the front-right wheel, the front-left wheel, the rear-right wheel, and the rear-left wheel, respectively. Incidentally, in the following description, the wheel cylinder pressure sensors 44FR to 44RL will be comprehensively referred to simply as "wheel cylinder pressure sensors 44" as well.

The above-mentioned electromagnetic on-off valves 22, the above-mentioned pressure increasing valves 40, the above-mentioned pressure reducing valves 42, the above-mentioned motor 32, and the like constitute a hydraulic actuator 70 as the fluid pressure generation mechanism of the apparatus 10 of the present embodiment. This hydraulic actuator 70 is controlled by a brake ECU 100 (hereinafter referred to simply as "the ECU 100").

In addition, a wheel speed sensor 60FR for the front-right wheel, a wheel speed sensor 60FL for the front-left wheel, a wheel speed sensor 60RR for the rear-right wheel, and a wheel speed sensor 60RL for the rear-left wheel are provided in the wheels respectively. Incidentally, in the following description, the wheel speed sensors 60FR to 60RL will be comprehensively referred to simply as "wheel speed sensors 60" as well. Each of the wheel speed sensors 60 generates a pulse signal every time the corresponding one of the wheels rotates by a predetermined angle. The wheel speed sensors 60 are electrically connected to the ECU 100. The ECU 100 specifies, based on the signals transmitted from the wheel speed sensors 60, whether the vehicle state of the vehicle is a running state or a stopped state. In concrete terms, the ECU 100 determines whether or not a signal input condition "that a pulse signal has been input from at least one of the four wheel speed sensors 60FR to 60RL" is fulfilled. If the signal input condition is fulfilled, the ECU 100 specifies that the vehicle state is the running state. If the signal input condition is not fulfilled (in other words, if no pulse signal has been input from any of the wheel speed sensors 60FR to 60RL), the ECU 100 specifies that the vehicle state is the stopped state. Incidentally, the ECU 100 also computes a speed of the vehicle (a vehicle speed) based on the signals transmitted from the wheel speed sensors 60.

The ECU 100 controls the braking forces applied to the wheels respectively, by controlling (more specifically, boosting, as will be described later) the wheel cylinder pressures in the wheel cylinders 84 based on the vehicle state. The ECU 100 is equipped with a CPU that performs various arithmetic operations, a ROM that stores various control programs including a program that will be described later, a RAM that is utilized as a work area for storing data and executing the programs, a non-volatile memory such as a backup RAM or the like that can hold stored contents even when the engine is stopped, an input/output interface, an A/D converter for converting analog signals input from various sensors and the like into digital signals and importing the digital signals, and the like (see FIG. 3).

The simulator cut valve 23 and the hydraulic actuator 70 are electrically connected to the ECU 100. More specifically, the electromagnetic on-off valves 22, the motor 32, the pressure increasing valves 40, the pressure reducing valves 42, and the like, which constitute the hydraulic actuator 70, are electrically connected to the ECU 100 (see FIG. 3). In addition, the ECU 100 can communicate with another electronic control unit (e.g., an upper-level hybrid ECU or the like) (not shown).

Figure 3:
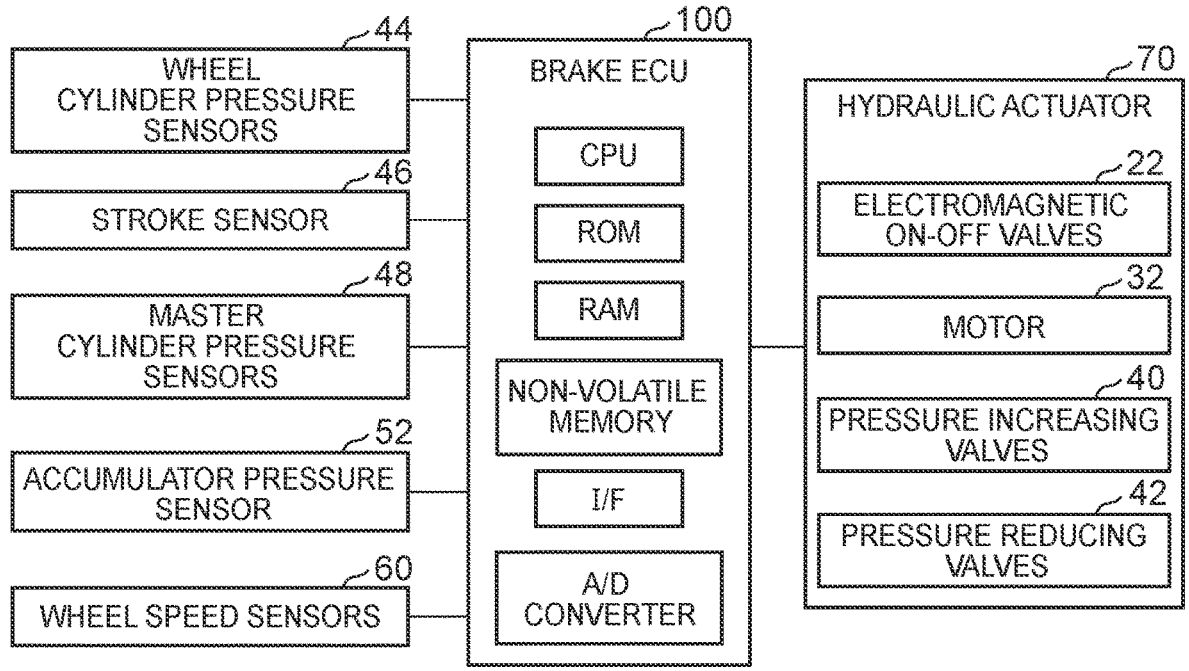
FIG. 3 is a block diagram showing the electric configuration of a brake ECU of FIG. 1 and a periphery thereof.

Furthermore, various sensors and switches that output signals for use in control are electrically connected to the ECU 100. That is, as shown in FIG. 3, signals representing wheel cylinder pressures in the wheel cylinders 84 are input to the ECU 100 from the wheel cylinder pressure sensors 44 that are electrically connected thereto respectively, a signal representing a pedal stroke of the brake pedal 12 is input to the ECU 100 from the stroke sensor 46 that is electrically connected thereto, signals representing master cylinder pressures are continuously input to the ECU 100 from the master cylinder pressure sensors 48 that are electrically connected thereto respectively, a signal representing an accumulator pressure is input to the ECU 100 from the accumulator pressure sensor 52 that is electrically connected thereto, and pulse signals are input to the ECU 100 from the wheel speed sensors 60 that are electrically connected thereto respectively.

Incidentally, although not shown in the drawing, signals are input to the ECU 100 from sensors other than the above-mentioned respective sensors. That is, a signal representing a yaw rate is input to the ECU 100 from a yaw rate sensor, a signal representing an acceleration of the vehicle is input to the ECU 100 from an acceleration sensor, and a signal representing a steering angle of a steering wheel is input to the ECU 100 from a steering angle sensor.

In the apparatus 10 of the present embodiment thus configured, brake regeneration cooperative control can be performed as described above. In concrete terms, the apparatus 10 of the present embodiment starts braking upon receiving a braking request. The braking request is created when the driver operates the brake pedal 12 (in other words, when a braking force should be applied to the vehicle). Upon receiving the braking request, the ECU 100 computes a required braking force, and calculates a required hydraulic braking force as a braking force that should be generated by the apparatus 10 of the present embodiment by subtracting a braking force resulting from regeneration from the required braking force. It should be noted herein that information on the braking force resulting from regeneration is supplied to the ECU 100 from the upper-level hybrid ECU (not shown). The ECU 100 calculates required fluid pressures (required wheel cylinder pressures) of the respective wheel cylinders 84 based on the calculated required hydraulic braking force. The ECU 100 decides values of control currents supplied to the pressure increasing valves 40 and the pressure reducing valves 42 through feedback control, such that the wheel cylinder pressures that are input from the wheel cylinder pressure sensors 44 become equal to the required fluid pressures respectively.

Thus, in the apparatus 10 of the present embodiment, high-pressure hydraulic fluid is supplied to the wheel cylinders 84 from the accumulator 50 via the pressure increasing valves 40 respectively, and braking forces are applied to the wheels respectively. In addition, hydraulic fluid is discharged from the wheel cylinders 84 via the pressure reducing valves 42 respectively as needed, and the braking forces applied to the wheels respectively are adjusted. It should be noted herein that a wheel cylinder pressure control system that includes the accumulator 50, the pressure increasing valves 40, the pressure reducing valves 42, and the like and that can control the wheel cylinder pressures of the wheel cylinders 84 independently of the operation of the brake pedal 12 is configured in the present embodiment. Accordingly, the wheel cylinder pressure control system performs so-called brake-by-wire-type braking force control.

When the braking forces are applied to the wheels respectively as described above, the electromagnetic on-off valves 22FR and 22FL are closed, and the simulator cut valve 23 is open. Therefore, the hydraulic fluid delivered from the master cylinder 14 through depression of the brake pedal 12 by the driver flows into the stroke simulator 24 through the simulator cut valve 23.

Incidentally, when the accumulator pressure is equal to or lower than a lower limit within a pressure accumulation set range set in advance, a current is supplied to the motor 32 by the ECU 100, the oil pump 34 is driven, and the accumulator pressure is raised. When the accumulator pressure enters the pressure accumulation set range and reaches an upper limit thereof due to this rise in pressure, the feed of electric power to the motor 32 is stopped.

Next, a brake control method of the present embodiment will be described. Conventionally, there is a problem in that the braking force decreases even when the required fluid pressure is constant, as a result of a phenomenon called heat reduction. In addition, there is a problem in that the braking force decreases as a result of a fall in the required fluid pressure due to depression force reduction. In the event of heat reduction and/or depression force reduction, the stopped vehicle may start moving against the driver's intention.

Thus, when the vehicle state shifts from the running state to the stopped state with the brake pedal 12 depressed by the driver (in other words, with fluid pressures generated to be applied to the wheel cylinders 84 respectively), the ECU 100 of the apparatus 10 of the present embodiment performs stop-time boost control for boosting the required fluid pressure by a predetermined fluid pressure while the vehicle is stopped. Owing to stop-time boost control, the braking force increases by a value corresponding to the boost in the required fluid pressure while the vehicle is stopped. Therefore, even when the braking force decreases in the event of heat reduction and/or depression force reduction, the possibility of the braking force becoming equal to or smaller than a braking force at the time when the vehicle starts moving is reduced. As a result, the possibility of the vehicle starting to move against the driver's intention can be reduced.

Figure 4A:
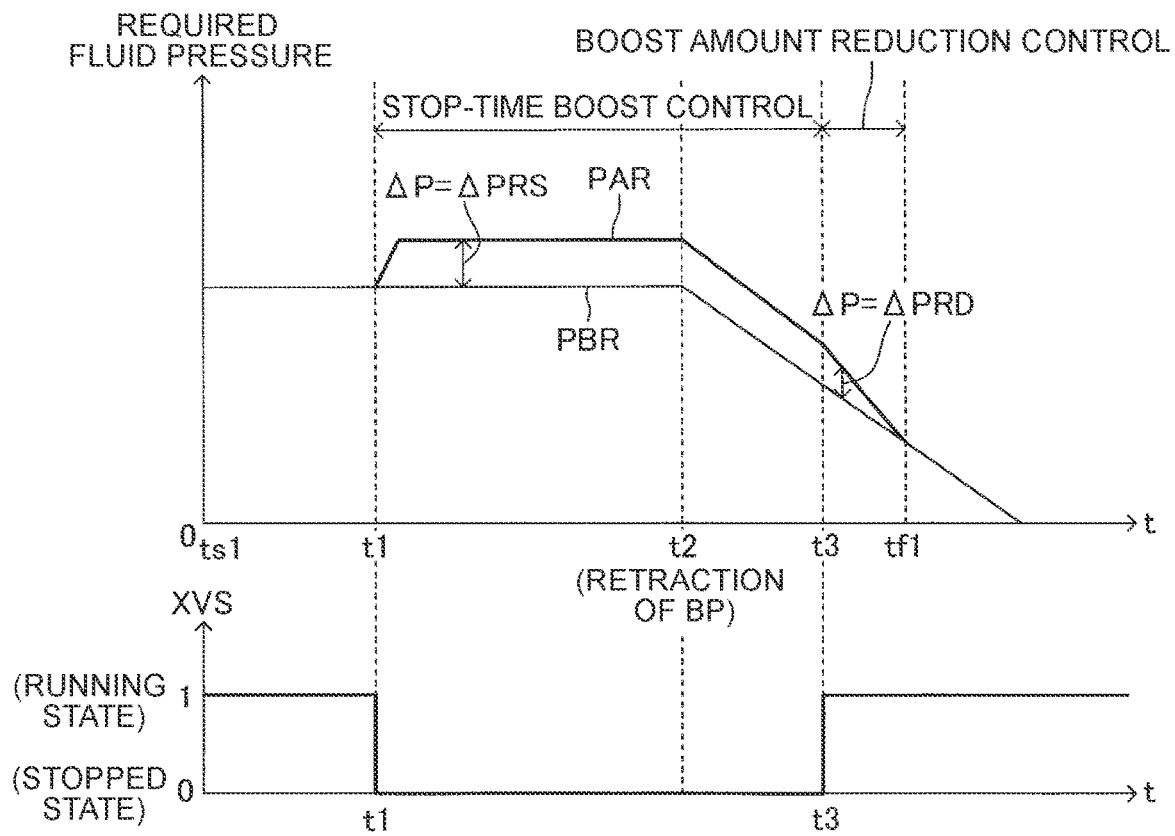
FIG. 4A is a graph showing a relationship between periods in which various kinds of boost control are performed and a vehicle state, and showing a boost amount of a required fluid pressure in these kinds of control.

A concrete description will be given hereinafter with reference to FIG. 4A. FIG. 4A is a graph showing a variation in the required fluid pressure with the passage of time, and is a graph showing a relationship among a period in which stop-time boost control and boost amount reduction control (which will be described later) are performed, the vehicle state, and the operation of the brake pedal by the driver. The ECU 100 sets a vehicle state flag XVS indicating whether the vehicle state is the running state or the stopped state, based on signals that are transmitted from the wheel speed sensors 60. The ECU 100 sets the value of the vehicle state flag XVS to "1" when the vehicle state is specified as the running state, and sets the value of the vehicle state flag XVS to "0" when the vehicle state is specified as the stopped state.

In an example of FIG. 4A, the driver has depressed the brake pedal 12 since a time point before a timing ts1 so as to stop the vehicle. The pedal stroke of the brake pedal 12 is constant at the latest during a period from the timing ts1. Then, at a time point as a timing t2, the driver retracts the brake pedal 12 so as to start the vehicle again. Due to this brake pedal operation, the vehicle is in the running state at the latest during a period from the timing ts1 to a timing t1, in the stopped state during a period from the timing t1 to a timing t3, and in the running state during a period from the timing t3. Therefore, the ECU 100 sets the value of the vehicle state flag XVS to "1" during the period from the timing ts1 to the timing t1, to "0" during the period from the timing t1 to the timing t3, and to "1" during the period from the timing t3.

When the value of the vehicle state flag XVS changes from "1" to "0" with the pedal stroke of the brake pedal 12 input from the stroke sensor 46 equal to or larger than a predetermined stroke threshold (in other words, with the required fluid pressure equal to or higher than a predetermined fluid pressure threshold), the ECU 100 performs stop-time boost control during a period in which the value of the vehicle state flag XVS is "0". In the present embodiment, the fluid pressure boosted in stop-time boost control (hereinafter also referred to simply as "a boost amount") is constant regardless of the pre-boost required fluid pressure. However, the boost amount may be set to a predetermined ratio (e.g., 10(%)) of the pre-boost required fluid pressure. In the example of FIG. 4A, the ECU 100 performs stop-time boost control during the period from the timing t1 (a first time point) to the timing t3. When the pre-boost required fluid pressure, the post-boost required fluid pressure, and a boost amount ΔP during the performance of stop-time boost control are denominated as "a required fluid pressure PBR", "a required fluid pressure PAR", and "a boost amount ΔPRS" respectively, there is established a relationship: the required fluid pressure PAR=the required fluid pressure PBR+the boost amount ΔPRS (ΔPRS is a constant) during the performance of stop-time boost control.

Incidentally, during the performance of boost amount reduction control and boost amount hold control that will be described later as well, the pre-boost required fluid pressure is denominated as "the required fluid pressure PBR", and the post-boost required fluid pressure is denominated as "the required fluid pressure PAR". In addition, the boost amount ΔP during the performance of boost amount reduction control is denominated as "a boost amount ΔPRD", and the boost amount ΔP during the performance of boost amount hold control is denominated as "a boost amount ΔPRK".

As described above, in the example of FIG. 4A, the vehicle state shifts from the stopped state to the running state at the timing t3. When the boosting of the required fluid pressure is ended (the boost amount is made equal to zero) at this time point (t=t3), the vehicle may start moving swiftly due to a sudden decrease in braking force. Thus, when the vehicle state shifts from the stopped state to the running state during the period in which stop-time boost control is performed, the ECU 100 performs boost amount reduction control for reducing the boost amount of the required fluid pressure at and after the time point when the vehicle state shifts to the running state with the passage of time, instead of stop-time boost control. Owing to boost amount reduction control, the braking force gently changes at the time point when the vehicle state shifts to the running state. Therefore, the possibility of the vehicle starting moving swiftly at this time point can be reduced.

Figure 4B:
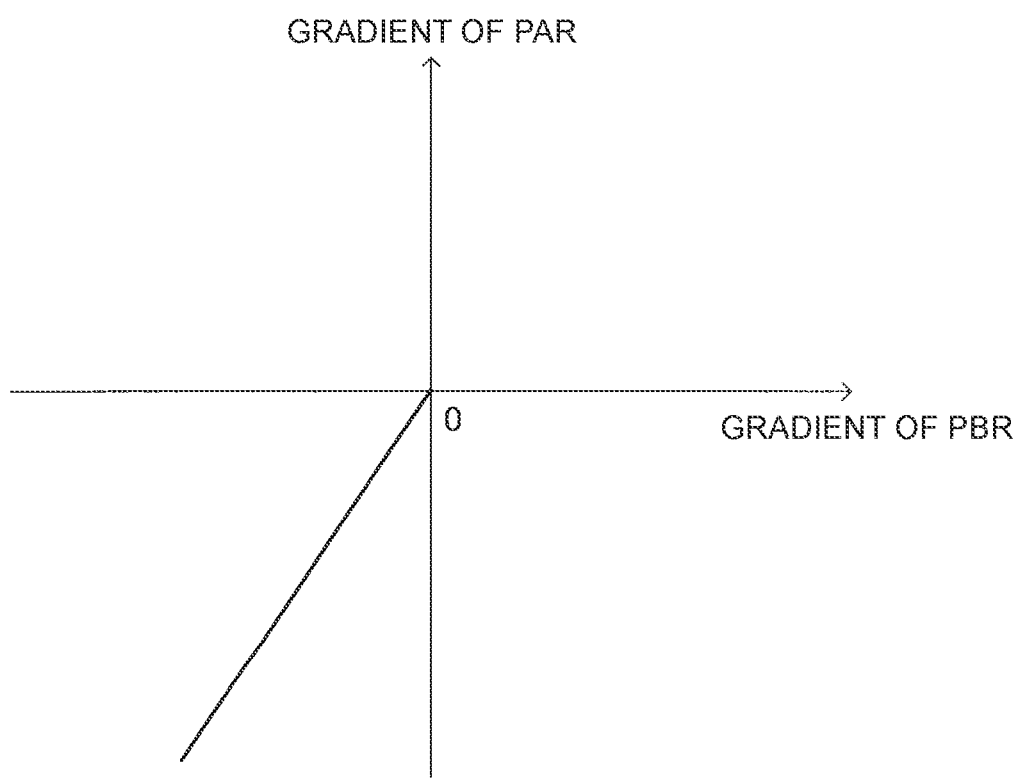
FIG. 4B is a graph prescribing a relationship between a pre-boost gradient of the required fluid pressure and a post-boost gradient of the required fluid pressure in boost amount reduction control.

A concrete description will be given hereinafter with reference to FIGS. 4A and 4B. FIG. 4B is a graph prescribing a relationship between the required fluid pressure PBR and the required fluid pressure PAR. This graph is stored in advance in the ROM of the ECU 100. When the value of the vehicle state flag changes from "0" to "1" during the period in which stop-time boost control is performed, the ECU 100 performs boost amount reduction control. At this time, the ECU 100 decides a gradient of the required fluid pressure PAR (in other words, a degree of decrease in the boost amount ΔPRD) with reference to the graph of FIG. 4B. The ECU 100 performs this control until the boost amount ΔPRD becomes equal to zero, as long as the driver continues to perform the operation of retracting the brake pedal 12 during the performance of boost amount reduction control. Incidentally, the case where the driver performs the operation of depressing the brake pedal 12 again during the performance of boost amount reduction control will be described later. In addition, in the following description, the driver's operation of depressing the brake pedal 12 and the driver's operation of retracting the brake pedal 12 will be also referred to simply as "depression operation" and "retraction operation" respectively.

In the example of FIG. 4A, the ECU 100 starts boost amount reduction control at the timing t3 (at a second time point). At this time, the ECU 100 computes a gradient of PBR at the timing t3, decides a gradient of PAR corresponding to the computed gradient of PBR with reference to the graph of FIG. 4B, and reduces the boost amount ΔPRD such that the gradient of PAR during the period in which boost amount reduction control is performed coincides with the decided gradient of PAR. In the example of FIG. 4A, retraction operation is continued during the performance of boost amount reduction control. Therefore, the ECU 100 performs boost amount reduction control until the boost amount ΔPRD becomes equal to zero at a timing tf1. During the performance of boost amount reduction control, there is established a relationship: the required fluid pressure PAR=the required fluid pressure PBR+the boost amount ΔPRD (ΔPRD is a variable that is decided from the graph of FIG. 4B).

It should be noted herein that a change in braking force does not coincide well with the driver's depression operation and hence the possibility of the driver feeling that the responsiveness of the brake pedal 12 has fallen is high when the boost amount ΔP is reduced in one of the following two cases, namely, "in the case where the driver stops retraction operation during the performance of boost amount reduction control (i.e., in the case where the pedal stroke becomes constant)" or "in the case where the driver performs depression operation again during the performance of boost amount reduction control" as well. Thus, the ECU 100 performs boost amount hold control for holding the boost amount ΔP of the required fluid pressure equal to the boost amount at the time point when retraction operation is stopped instead of boost amount reduction control when the driver's retraction operation is stopped during the period in which boost amount reduction control is performed, and holding the boost amount ΔP of the required fluid pressure equal to the boost amount at the time point when depression operation is resumed instead of boost amount reduction control when the driver's depression operation is resumed during the period in which boost amount reduction control is performed (which will be described later with reference to FIGS. 5A and 5B).

Incidentally, during the period in which boost amount reduction control is performed, the required fluid pressure PBR (and the required fluid pressure PAR) tends to fall. Therefore, the above-mentioned "case where the driver's retraction operation is stopped" means a case where the variation in the required fluid pressure PBR changes from a decreasing tendency to a remaining tendency, and the above-mentioned "case where the driver's depression operation is resumed" means a case where the variation in the required fluid pressure PBR changes from the decreasing tendency to an increasing tendency.

The ECU 100 performs boost amount hold control over a period to a time point when the vehicle state shifts from the running state to the stopped state again (which will be described later with reference to FIG. 5A) or a period to a time point when the variation in the required fluid pressure PBR changes from the remaining tendency or the increasing tendency to the decreasing tendency again (which will be described later with reference to FIG. 5B).

Owing to boost amount hold control, the variation in braking force coincides well with the driver's depression operation, so the possibility of the driver feeling that the responsiveness of the brake pedal 12 has fallen can be reduced. In addition, even when heat reduction occurs during the period in which boost amount hold control is performed, the possibility of the braking force becoming smaller than the required braking force can be reduced.

Figure 5A:
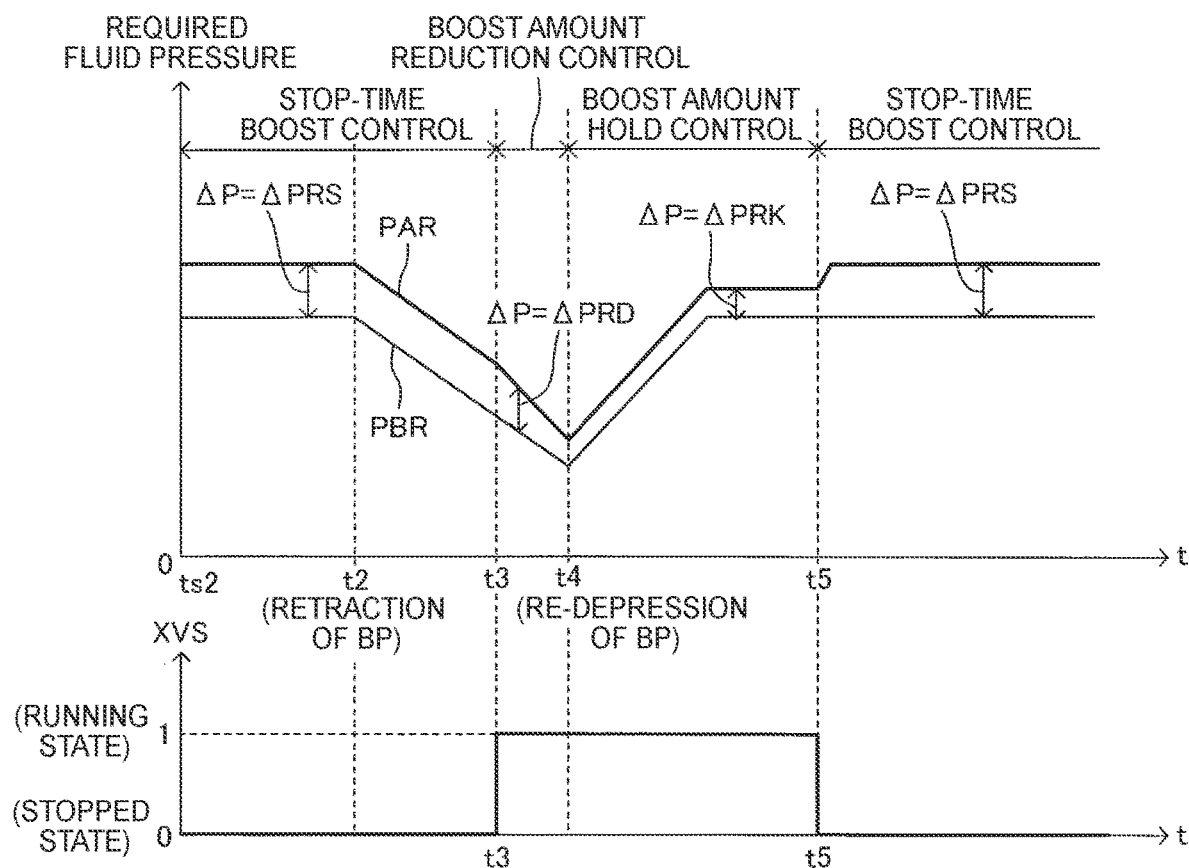
FIG. 5A is a graph showing a relationship among the periods in which the various kinds of boost control are performed, the vehicle state, and the operation of a brake pedal, and showing the boost amount of the required fluid pressure in these kinds of control.

A concrete description will be given hereinafter with reference to FIGS. 5A and 5B. Each of FIGS. 5A and 5B is a graph showing a variation in the required fluid pressure with the passage of time, and is a graph showing a relationship among the periods in which stop-time boost control, boost amount reduction control, and boost amount hold control are performed, the vehicle state, and the driver's operation of the brake pedal. A timing ts2 in each of FIGS. 5A and 5B is an arbitrary timing between the timing t1 and the timing t2 in FIG. 4A. In addition, the variation in required fluid pressure with the passage of time, the vehicle state, and the operation of the brake pedal during the period from the timing ts2 to the timing t3 in each of FIGS. 5A and 5B are the same as the variation in required fluid pressure with the passage of time, the vehicle state, and the operation of the brake pedal during the period to the timing t3 in FIG. 4A respectively. FIGS. 5A and 5B are identical to each other in that the driver performs depression operation again at a timing t4, namely, that the variation in the required fluid pressure PBR changes from the decreasing tendency to the increasing tendency at the timing t4 (at a third time point). However, FIGS. 5A and 5B are different from each other in that depression operation is continued in FIG. 5A whereas the driver performs retraction operation again at a timing t6 in FIG. 5B.

An example of FIG. 5A illustrates a scene in which depression force reduction occurs at the timing t2 when the vehicle is in the stopped state through the driver's own operation of the brake pedal, the vehicle starts moving against the driver's intention at the timing t3 as a result, the driver therefore performs depression operation again at the timing t4, and hence the vehicle is stopped again at a timing t5. The ECU 100 sets the value of the vehicle state flag XVS to "1" during a period from the timing t3 to the timing t5, and to "0" during a period from the timing t5.

In this example, boost amount reduction control is started at the timing t3, and the variation in the required fluid pressure PB changes from the decreasing tendency to the increasing tendency at the timing t4, namely, a time point before the boost amount becomes equal to zero (i.e., during the performance of boost amount reduction control). Therefore, the ECU 100 performs boost amount hold control instead of boost amount reduction control at the timing t4. The ECU 100 holds the boost amount ΔPRK during the period in which boost amount hold control is performed equal to the boost amount ΔP at the timing t4. As in the example of FIG. 5A, when the vehicle state shifts from the running state to the stopped state again at the timing t5 as a time point during the performance of boost amount hold control, the ECU 100 performs boost amount hold control until the timing t5, and then performs the above-mentioned stop-time boost control during the period in which the vehicle is in the stopped state. During the performance of boost amount hold control, there is established a relationship: the required fluid pressure PAR=the required fluid pressure PBR+the boost amount ΔPRK (ΔPRK is a constant (<ΔPRS)).

Figure 5B:
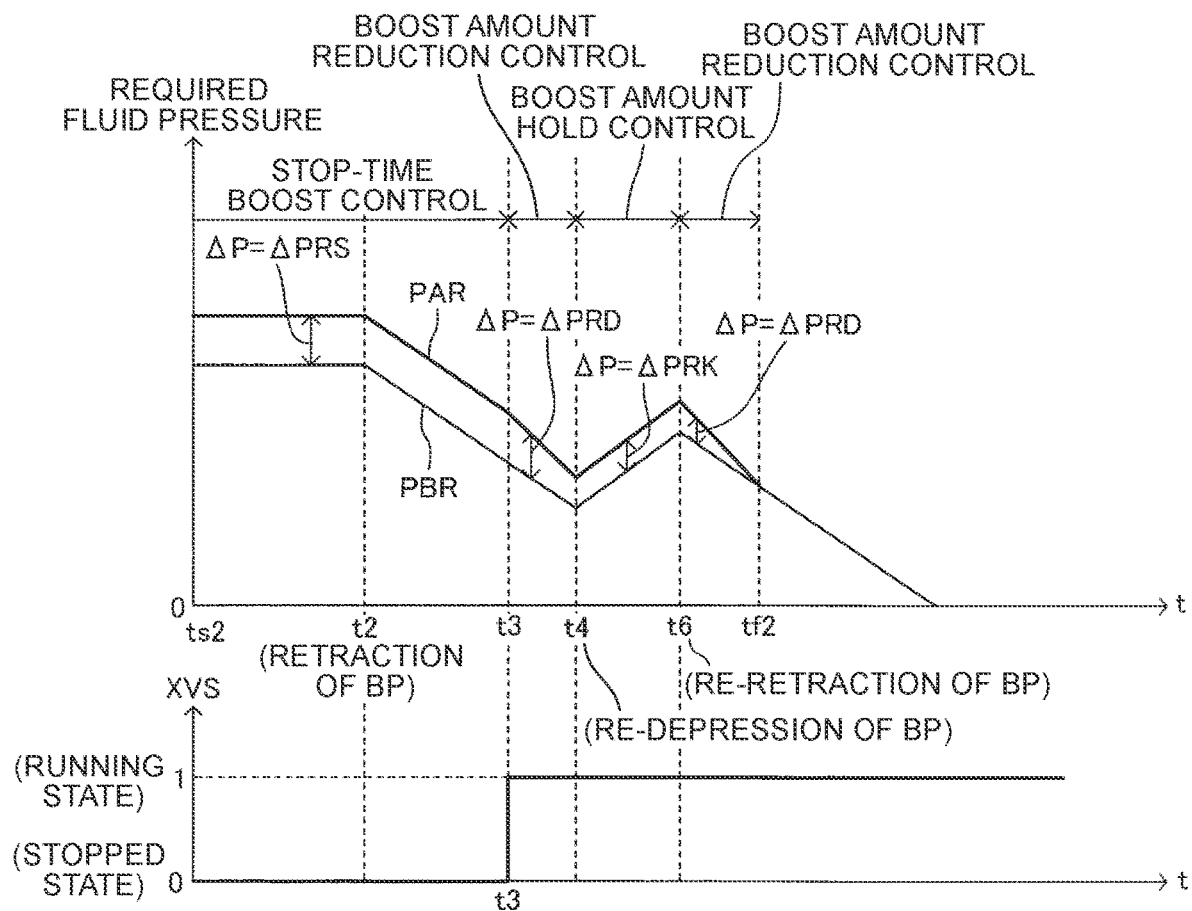
FIG. 5B is a graph showing a relationship among the periods in which the various kinds of boost control are performed, the vehicle state, and the operation of the brake pedal, and showing the boost amount of the required fluid pressure in these kinds of control.

On the other hand, an example of FIG. 5B illustrates a scene in which the vehicle starts moving at the timing t3, the driver hence performs depression operation again at the timing t4, but the driver performs retraction operation again at the timing t6 due to a change in circumstances (e.g., because although depression operation is performed in response to the start of movement of the vehicle that waits for a traffic light to turn green, the traffic light turns green immediately thereafter).

In this example, boost amount reduction control is started at the timing t3, and the variation in the required fluid pressure PBR changes from the decreasing tendency to the increasing tendency at the timing t4 as the time point when the boost amount has not become equal to zero yet (i.e., during the performance of boost amount reduction control). Therefore, the ECU 100 performs boost amount hold control instead of boost amount reduction control at the timing t4. The ECU 100 holds the boost amount ΔPRK during the period in which boost amount hold control is performed equal to the boost amount ΔP at the timing t4. As in the example of FIG. 5B, when the variation in the required fluid pressure PBR changes from the increasing tendency to the decreasing tendency again at the timing t6 as the time point during the performance of boost amount hold control, the ECU 100 performs boost amount hold control until the timing t6, and then performs the above-mentioned boost amount reduction control. The ECU 100 performs boost amount reduction control until the boost amount ΔPRD becomes equal to zero at a timing tf2. During the performance of boost amount hold control, there is established a relationship: the required fluid pressure PAR=the required fluid pressure PBR+the boost amount ΔPRK (ΔPRK is a constant (<ΔPRS)).

The CPU of the ECU 100 carries out routines indicated by flowcharts in FIGS. 6 to 9 every time a predetermined time elapses. In an initialization routine that is carried out when the position of an ignition key switch of the vehicle (not shown) is changed from an off position to an on position, the CPU sets values of various flags that will be described later to "0".

Figure 6:
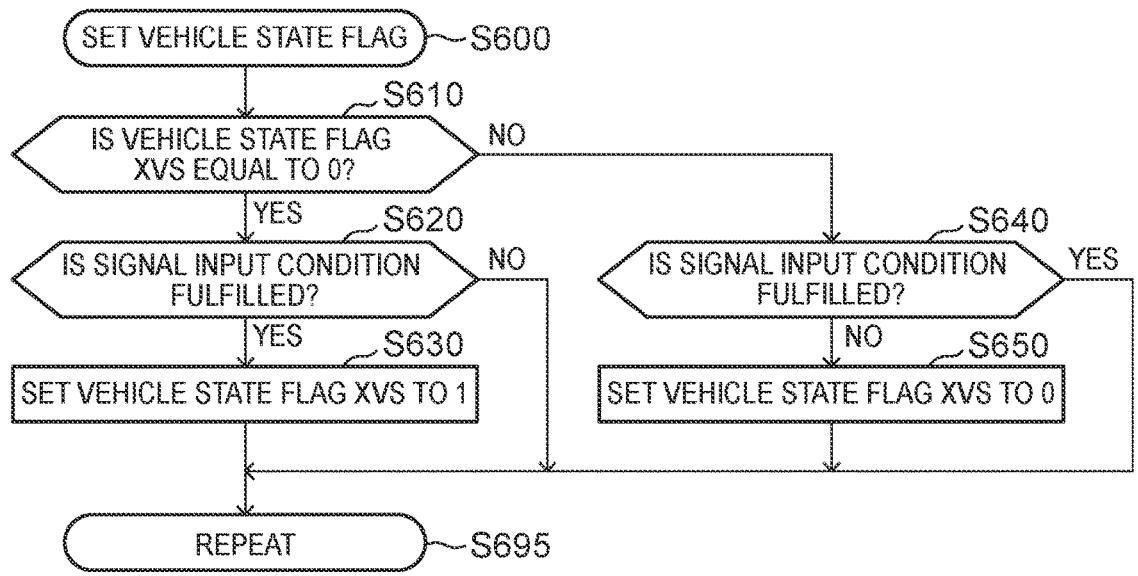
FIG. 6 is a flowchart showing a routine that is executed by a CPU of the brake ECU of FIG. 1 (hereinafter also referred to simply as the CPU)

At a certain timing, the CPU starts a vehicle state flag setting process from step 600 of FIG. 6, and determines in step 610 whether the value of the vehicle state flag XVS is "0". If the value of the vehicle state flag XVS is "0", the CPU determines that the result of step 610 is "Yes", and proceeds to step 620.

In step 620, the CPU determines whether or not a signal input condition is fulfilled. If the signal input condition is fulfilled, the CPU determines that the result of step 620 is "Yes" (i.e., determines that the vehicle is in the running state), sets the value of the vehicle state flag XVS to "1", and stores the value into the RAM thereof. After that, the CPU proceeds to step 695, and temporarily ends the present routine. On the other hand, if the signal input condition is not fulfilled, the CPU determines that the result of step 620 is "No" (i.e., determines that the vehicle is in the stopped state), proceeds to step 695, and temporarily ends the present routine.

On the other hand, if the value of the vehicle state flag XVS is "1" in step 610, the CPU determines that the result of step 610 is "No", and proceeds to step 640.

In step 640, the CPU determines whether or not the signal input condition is fulfilled. If the signal input condition is not fulfilled, the CPU determines that the result of step 640 is "No" (i.e., determines that the vehicle is in the stopped state), sets the value of the vehicle state flag XVS to "0", and stores the value into the RAM thereof. After that, the CPU proceeds to step 695, and temporarily ends the present routine. On the other hand, if the signal input condition is fulfilled, the CPU determines that the result of step 640 is "Yes" (i.e, determines that the vehicle is in the running state), then proceeds to step 695, and temporarily ends the present routine.

Figure 7:
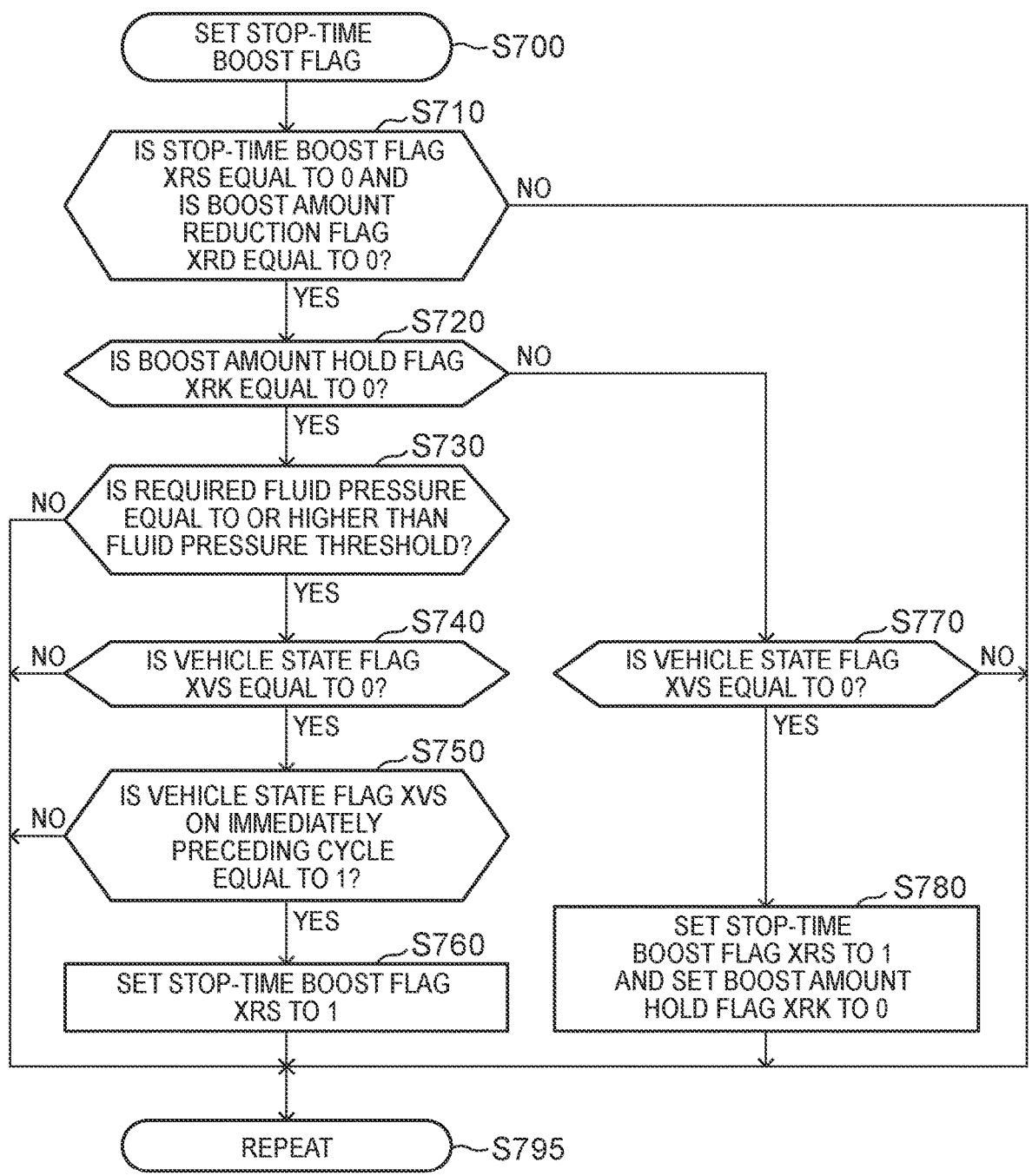
FIG. 7 is a flowchart showing another routine that is executed by the CPU.

At a certain timing, the CPU starts a stop-time boost flag setting process from step 700 of FIG. 7, and determines in step 710 whether or not the value of the stop-time boost flag XRS is "0" and the value of the boost amount reduction flag XRD is "0". It should be noted herein that the stop-time boost flag XRS is a flag indicating whether or not stop-time boost control is performed, and that the value thereof is set to "1" when stop-time boost control is performed, and to "0" when stop-time boost control is not performed. The boost amount reduction flag XRD is a flag indicating whether or not boost amount reduction control is performed, and the value thereof is set to "1" when boost amount reduction control is performed, and to "0" when boost amount reduction control is not performed.

If the value of the stop-time boost flag XRS or the value of the boost amount reduction flag XRD is "1" (i.e., stop-time boost control or boost amount reduction control is performed), the CPU determines that the result of step 710 is "No", proceeds to step 795, and temporarily ends the present routine. On the other hand, if both the value of the stop-time boost flag XRS and the value of the boost amount reduction flag XRD are "0" (i.e., neither stop-time boost control nor boost amount reduction control is performed), the CPU determines that the result of step 710 is "Yes", and proceeds to step 720.

In step 720, the CPU determines whether or not the value of the boost amount hold flag XRK is "0". It should be noted herein that the boost amount hold flag XRK is a flag indicating whether or not boost amount hold control is performed, and that the value thereof is set to "1" when boost amount hold control is performed, and to "0" when boost amount hold control is not performed. If the value of the boost amount hold flag XRK is "0" (i.e., boost amount hold control is not performed (more specifically, no boost control is performed)), the CPU determines that the result of step 720 is "Yes", and proceeds to step 730.

In step 730, the CPU determines whether or not the required fluid pressure is equal to or higher than the fluid pressure threshold. If the required fluid pressure is lower than the fluid pressure threshold, the CPU determines that the result of step 730 is "No" (i.e., determines that no braking request is created), proceeds to step 795, and temporarily ends the present routine. On the other hand, if the required fluid pressure is equal to or higher than the fluid pressure threshold, the CPU determines that the result of step 730 is "Yes" (i.e., determines that a braking request is created), and proceeds to step 740.

In step 740, the CPU determines whether or not the value of the vehicle state flag XVS is "0". If the value of the vehicle state flag XVS is "1" (i.e., the vehicle is in the running state), the CPU determines that the result of step 740 is "No", proceeds to step 795, and temporarily ends the present routine. On the other hand, if the value of the vehicle state flag XVS is "0" (i.e., the vehicle is in the stopped state), the CPU determines that the result of step 740 is "Yes", and proceeds to step 750.

In step 750, the CPU determines whether or not the value of the vehicle state flag XVS on the immediately preceding cycle is "1". If the value of the vehicle state flag XVS on the immediately preceding cycle is "0" (i.e., the vehicle has been in the stopped state from the immediately preceding cycle to the present cycle), the CPU determines that the result of step 750 is "No", proceeds to step 795, and temporarily ends the present routine. On the other hand, if the value of the vehicle state flag XVS on the immediately preceding cycle is "1" (i.e., the vehicle state has shifted from the running state to the stopped state from the immediately preceding cycle to the present cycle), the CPU determines that the result of step 750 is "Yes", and proceeds to step 760.

In step 760, the CPU sets the value of the stop-time boost flag XRS to "1", and starts stop-time boost control (see the timing t1 in FIG. 4A). In addition, the CPU stores the value of the flag XRS into the RAM thereof. After that, the CPU proceeds to step 795, and temporarily ends the present routine.

On the other hand, if the value of the boost amount hold flag XRK is "1" (i.e., boost amount hold control is performed) in step 720, the CPU determines that the result of step 720 is "No", and proceeds to step 770. Incidentally, as described above, the vehicle is in the running state during the performance of boost amount hold control.

In step 770, the CPU determines whether or not the value of the vehicle state flag is "0". If the value of the vehicle state flag XVS is "1" (i.e., the vehicle is in the running state), the CPU determines that the result of step 770 is "No", proceeds to step 795, and temporarily ends the present routine. On the other hand, if the value of the vehicle state flag XVS is "0" (i.e., the vehicle state has shifted from the running state to the stopped state), the CPU determines that the result of step 770 is "Yes", and proceeds to step 780.

In step 780, the CPU sets the value of the stop-time boost flag XRS to "1", and sets the value of the boost amount hold flag XRK to "0" to end boost amount hold control and start stop-time boost control (see the timing t5 in FIG. 5A). In addition, the CPU stores the value of the flag XRS and the value of the flag XRK into the RAM thereof. After that, the CPU proceeds to step 795, and temporarily ends the present routine.

Figure 8:
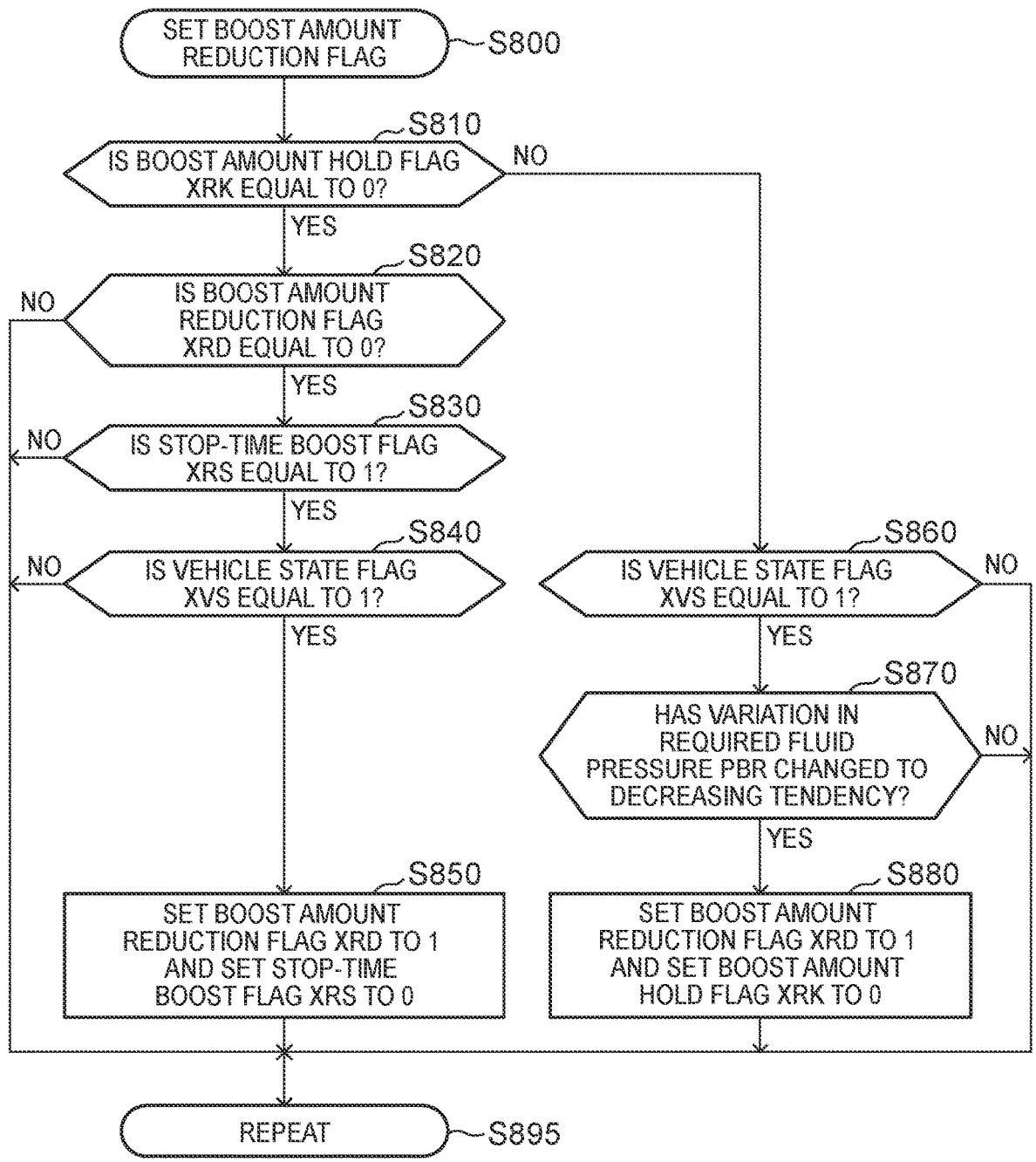
FIG. 8 is a flowchart showing still another routine that is executed by the CPU.

At a certain timing, the CPU starts a boost amount reduction flag setting process from step 800 of FIG. 8, and determines in step 810 whether or not the value of the boost amount hold flag XRK is "0". If the value of the boost amount hold flag XRK is "0" (i.e., boost amount hold control is not performed), the CPU determines that the result of step 810 is "Yes", and proceeds to step 820.

In step 820, the CPU determines whether or not the value of the boost amount reduction flag XRD is "0". If the value of the boost amount reduction flag XRD is "1" (i.e., boost amount reduction control is performed), the CPU determines that the result of step 820 is "No", proceeds to step 895, and temporarily ends the present routine. On the other hand, if the value of the boost amount reduction flag XRD is "0" (i.e., boost amount reduction control is not performed), the CPU determines that the result of step 820 is "Yes", and proceeds to step 830.

In step 830, the CPU determines whether or not the value of the stop-time boost flag XRS is "1". If the value of the stop-time boost flag XRS is "0" (i.e., stop-time boost control is not performed), the CPU determines that the result of step 830 is "No", proceeds to step 895, and temporarily ends the present routine. On the other hand, if the value of the stop-time boost flag XRS is "1" (i.e., stop-time boost control is performed), the CPU determines that the result of step 830 is "Yes", and proceeds to step 840. Incidentally, as described above, the vehicle is in the stopped state during the performance of stop-time boost control.

In step 840, the CPU determines whether or not the value of the vehicle state flag XVS is "1". If the value of the vehicle state flag XVS is "0" (i.e., the vehicle is in the stopped state), the CPU determines that the result of step 840 is "No", proceeds to step 895, and temporarily ends the present routine. On the other hand, if the value of the vehicle state flag XVS is "1" (i.e., the vehicle state has shifted from the stopped state to the running state), the CPU determines that the result of step 840 is "Yes", and proceeds to step 850.

In step 850, the CPU sets the value of the boost amount reduction flag XRD to "1", and sets the value of the stop-time boost flag XRS to "0" to end stop-time boost control and start boost amount reduction control (see the timing t3 in FIGS. 4A, 5A, and 5B). In addition, the CPU stores the value of the flag XRD and the value of the flag XRS into the RAM thereof. After that, the CPU proceeds to step 895, and temporarily ends the present routine.

On the other hand, if the value of the boost amount hold flag XRK is "1" (i.e., boost amount hold control is performed) in step 810, the CPU determines that the result of step 810 is "No", and proceeds to step 860. Incidentally, as described above, the vehicle is in the running state during the performance of boost amount hold control.

In step 860, the CPU determines whether or not the value of the vehicle state flag XVS is "1". If the value of the vehicle state flag XVS is "0" (i.e., the vehicle state has shifted from the running state to the stopped state), the CPU determines that the result of step 860 is "No", proceeds to step 895, and temporarily ends the present routine. On the other hand, if the value of the vehicle state flag XVS is "1" (i.e., the vehicle is in the running state), the CPU determines that the result of step 860 is "Yes", and proceeds to step 870.

In step 870, the CPU determines whether or not the variation in the required fluid pressure PBR has changed from the remaining or increasing tendency to the decreasing tendency. If the variation in the required fluid pressure PBR has not changed to the decreasing tendency (i.e., the variation in the required fluid pressure PBR continues to demonstrate the remaining or increasing tendency), the CPU determines that the result of step 870 is "No", proceeds to step 895, and temporarily ends the present routine. On the other hand, if the variation in the required fluid pressure PBR has changed to the decreasing tendency (i.e., the driver has performed retraction operation), the CPU determines that the result of step 870 is "Yes", and proceeds to step 880.

In step 880, the CPU sets the value of the boost amount reduction flag XRD to "1", and sets the value of the boost amount hold flag XRK to "0" to end boost amount hold control and start boost amount reduction control (see the timing t6 in FIG. 5B). In addition, the CPU stores the value of the flag XRD and the value of the flag XRK into the RAM thereof. After that, the CPU proceeds to step 895, and temporarily ends the present routine.

Figure 9:
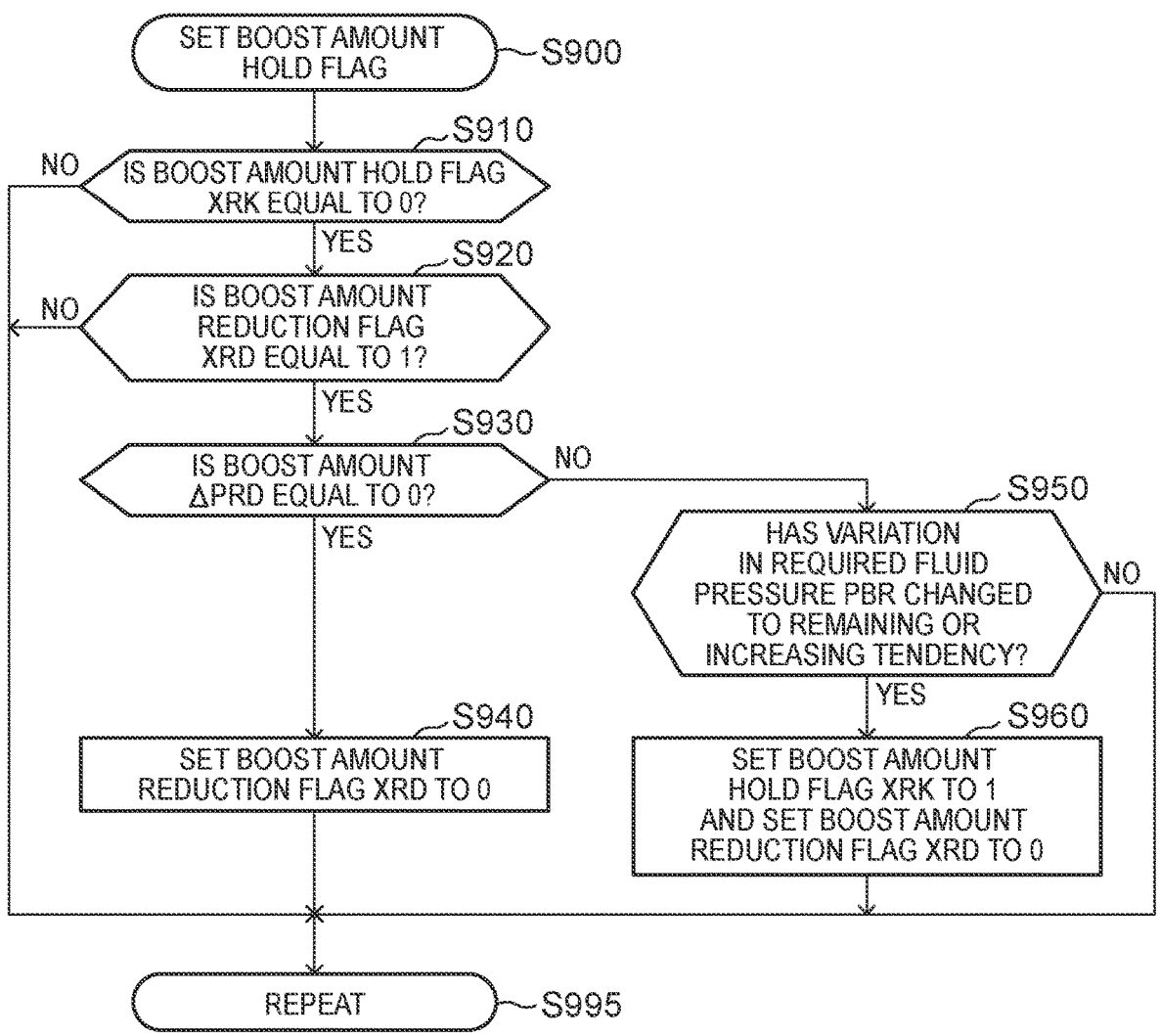
FIG. 9 is a flowchart showing still another routine that is executed by the CPU.

At a certain timing, the CPU starts a boost amount hold flag setting process from step 900 of FIG. 9, and determines in step 910 whether or not the value of the boost amount hold flag XRK is "0". If the value of the boost amount hold flag XRK is "1" (i.e., boost amount hold control is performed), the CPU determines that the result of step 910 is "No", proceeds to step 995, and temporarily ends the present routine. On the other hand, if the value of the boost amount hold flag XRK is "0" (i.e., boost amount hold control is not performed), the CPU determines that the result of step 910 is "Yes", and proceeds to step 920.

In step 920, the CPU determines whether or not the value of the boost amount reduction flag XRD is "1". If the value of the boost amount reduction flag XRD is "0" (i.e., boost amount reduction control is not performed), the CPU determines that the result of step 920 is "No", proceeds to step 995, and temporarily ends the present routine. On the other hand, if the value of the boost amount reduction flag XRD is "1" (i.e., boost amount reduction control is performed), the CPU determines that the result of step 920 is "Yes", and proceeds to step 930.

In step 930, the CPU determines whether or not the boost amount $\Delta PRD$ in boost amount reduction control has become equal to zero. If the boost amount $\Delta PRD$ has become equal to zero, the CPU determines that the result of step 930 is "Yes", and proceeds to step 940. In step 940, the CPU sets the value of the boost amount reduction flag to "0", and ends boost amount reduction control (see the timing tf1 in FIG. 4A and the timing tf2 in FIG. 5B). In addition, the CPU stores the value of the flag XRD into the RAM thereof. After that, the CPU proceeds to step 995, and temporarily ends the present routine. On the other hand, if the boost amount $\Delta PRD$ is not equal to zero, the CPU determines that the result of step 930 is "No", and proceeds to step 950.

In step 950, the CPU determines whether or not the variation in the required fluid pressure PBR has changed from the decreasing tendency to the remaining or increasing tendency. If the variation in the required fluid pressure PBR has not changed to the remaining or increasing tendency (i.e., continues to demonstrate the decreasing tendency), the CPU determines that the result of step 950 is "No", proceeds to step 995, and temporarily ends the present routine. On the other hand, if the variation in the required fluid pressure PBR has changed to the remaining or increasing tendency (i.e., the driver has stopped retraction operation or performed depression operation), the CPU determines that the result of step 950 is "Yes", and proceeds to step 960.

In step 960, the CPU sets the value of the boost amount hold flag XRK to "1", and sets the value of the boost amount reduction flag XRD to "0" to end boost amount reduction control and start boost amount hold control (see the timing t4 in FIGS. 5A and 5B). In addition, the CPU stores the value of the flag XRK and the value of the flag XRD into the RAM thereof. After that, the CPU proceeds to step 995, and temporarily ends the present routine.

Modification Example

A braking force control apparatus according to the modification example (which will be hereinafter referred to also as "the modified apparatus", and a vehicle mounted with the modified apparatus will be hereinafter referred to also as "the own vehicle") is different from the apparatus 10 of the present embodiment in that a brake ECU performs various kinds of driving support control, and that a braking request is created based on these kinds of driving support control. As driving support control, for example, adaptive cruise control (ACC), pre-crash brake control (PBC), and the like can be mentioned. The following description will focus on the difference from the apparatus 10 of the present embodiment.

ACC is well-known control for causing the own vehicle to run at a constant speed such that an actual vehicle speed thereof coincides with a set vehicle speed when there is no vehicle (preceding vehicle) running in front of the own vehicle, and causing the own vehicle to run such that an inter-vehicle distance from a preceding vehicle acquired from a periphery sensor (not shown) coincides with a set inter-vehicle distance when the preceding vehicle exists. A braking request is continuously created during a period in which the brake ECU performs deceleration control based on ACC.

PBC is well-known control for issuing a warning to draw a driver's attention when there is an object that is likely to collide with the own vehicle, and automatically generating a braking force when the possibility of collision increases afterward. A braking request is continuously created during a period in which the predicted time of collision with the object is equal to or shorter than a predetermined time threshold.

Upon receiving the braking request during the performance of ACC or PBC, the brake ECU computes a required braking force, calculates a required hydraulic braking force to be generated by the modified apparatus by subtracting a braking force resulting from regeneration from the required braking force, calculates a required fluid pressure of each of the wheel cylinders 84 based on the calculated required hydraulic braking force, and performs feedback control such that each of the wheel cylinder pressures becomes equal to the required fluid pressure, as is the case with the ECU 100 of the apparatus 10 of the first embodiment.

According to this configuration, the possibility of the vehicle starting to move against the driver's intention as a result of heat reduction can be reduced in particular. Incidentally, the modified apparatus may be applied to the apparatus 10 of the present embodiment. That is, the braking request may be created through the driver's operation of the brake pedal or based on driving support control, in a braking force control apparatus adopting a brake-by-wire system.

Although the braking force control apparatuses according to the embodiment and modification example of the disclosure have been described above, the disclosure is not limited thereto, but can be subjected to various alterations within such a range as not to depart from the object of the disclosure. For example, the braking force control apparatus may be configured to adopt a mechanical hydraulic circuit. In this case, the braking force control apparatus is equipped with a hydraulic circuit capable of controlling the required fluid pressure, separately from the mechanical hydraulic circuit.

Figure 10:
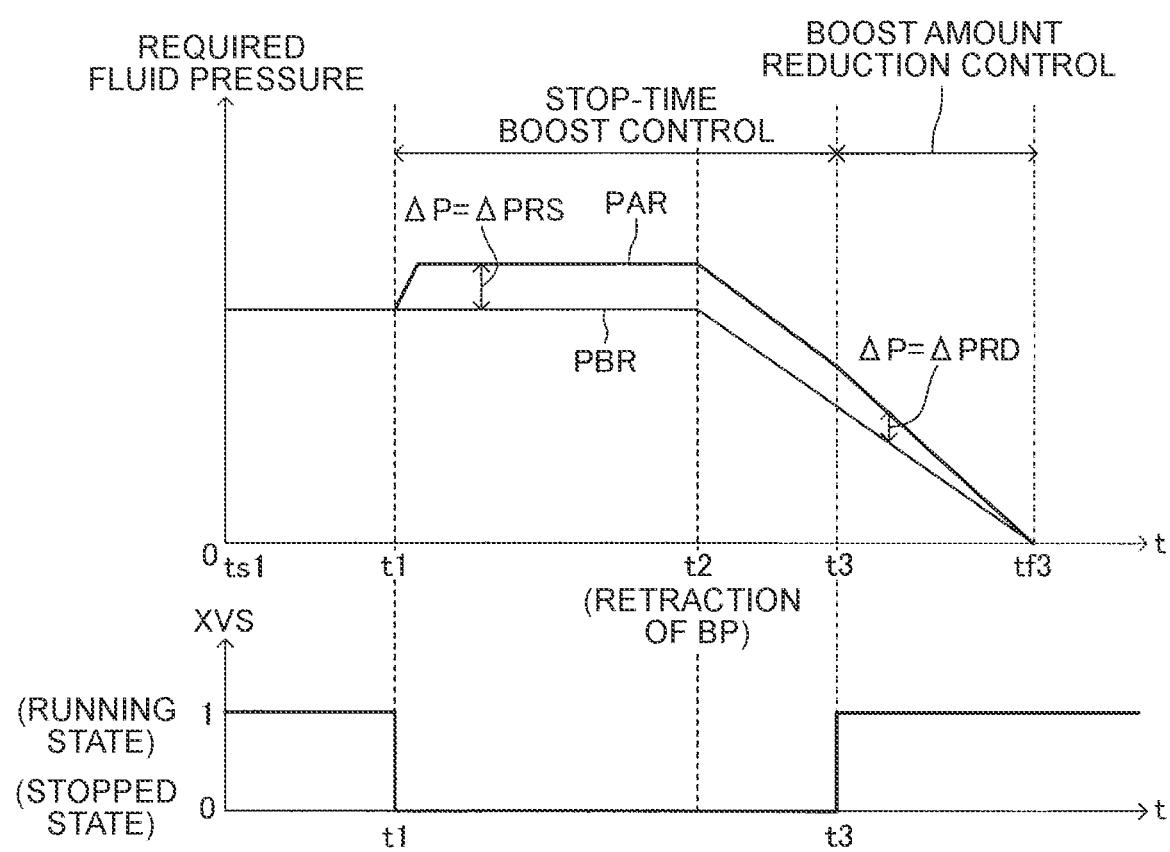
FIG. 10 is a graph showing a degree of reduction in the boost amount in the case where a braking force control apparatus according to a modification example of the disclosure performs boost amount reduction control.

In addition, the degree of decrease in the boost amount ΔPRD during the period in which boost amount reduction control is performed may be calculated based on a ratio between the required fluid pressure PBR and the boost amount ΔPRD at the timing t3 as shown in FIG. 10, instead of referring to the graph of FIG. 4A. FIG. 10 is a graph that is identical to FIG. 4A except in the degree of decrease in the boost amount ΔPRD in boost amount reduction control. In this method, the boost amount ΔPRD is calculated (decided) such that the ratio between the required fluid pressure PBR and the boost amount ΔPRD at the timing t3 is held. According to this method, the boost amount ΔPRD also becomes equal to zero at a timing tf3 as the time point when the required fluid pressure PBR becomes equal to zero.

What is claimed is:

1. A braking force control apparatus configured to control a braking force applied to each of wheels of a vehicle, the braking force control apparatus comprising:
   a fluid pressure generation mechanism configured to generate a fluid pressure associated with a required braking force corresponding to a braking request, as a required fluid pressure, when the braking request is made;
   a braking mechanism provided in each of the wheels and includes a rotary member that rotates together with each of the wheels, and a braking member that is able to come into contact with the rotary member, the braking mechanism being configured to apply a braking force depending on the required fluid pressure to each of the wheels through pressing of the braking member against the rotating rotary member due to the required fluid pressure; and
   an electronic control unit configured to;
      control the fluid pressure generation mechanism,
      specify whether a vehicle state of the vehicle is a running state or a stopped state, and
      perform, when the required fluid pressure is generated and the specified vehicle state shifts from the running state to the stopped state at a first time point, stop-time boost control to boost the required fluid pressure at and after the first time point.

2. The braking force control apparatus according to claim 1, wherein
   the electronic control unit is configured to, when the specified vehicle state shifts from the stopped state to the running state at a second time point during a period in which the stop-time boost control is performed, end the stop-time boost control and perform boost amount reduction control to reduce a boost amount of the required fluid pressure at and after the second time point with passage of time.

3. The braking force control apparatus according to claim 2, wherein the electronic control unit is configured to, when a variation in fluid pressure changes from a decreasing tendency to a remaining or increasing tendency at a third time point during a period in which the boost amount reduction control is performed, end the boost amount reduction control and perform boost amount hold control to hold the boost amount of the required fluid pressure equal to the boost amount at the third time point during a first period or a second period, the first period is a period from the third time point to a time point when the specified vehicle state shifts from the running state to the stopped state again, and the second period is a period from the third time point to a time point when the variation in fluid pressure changes to the decreasing tendency again, the variation in fluid pressure is a variation in the required fluid pressure obtained through subtracting the boost amount from the required fluid pressure.

* * * * *